US009344215B2

(12) United States Patent
Melts et al.

(10) Patent No.: US 9,344,215 B2
(45) Date of Patent: May 17, 2016

(54) SYSTEMS AND METHODS FOR ADVANCED POWER MANAGEMENT FOR OPTICAL NETWORK TERMINAL SYSTEMS ON CHIP (71) Applicants: Marvell International Ltd., Hamilton (BM); Marvell Israel (M.I.S.L) Ltd., Yokneam (IL)

(72) Inventors: Dimitry Melts, Cupertino, CA (US); Roman Kleinerman, Beit Oved (IL); Amit Avivi, Tel-Mond (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 148 days.

(21) Appl. No.: 14/028,796

(22) Filed: Sep. 17, 2013

(65) Prior Publication Data
US 2014/0105603 A1 Apr. 17, 2014

Related U.S. Application Data (60) Provisional application No. 61/713,876, filed on Oct. 15, 2012.

(51) Int. Cl.
 *H04J 14/08* (2006.01)
 *H04Q 11/00* (2006.01)
(52) U.S. Cl.
 CPC ............ *H04J 14/08* (2013.01); *H04Q 11/0067* (2013.01); *H04Q 2011/0064* (2013.01)
(58) Field of Classification Search
 USPC .......................................................... 398/67
 See application file for complete search history.

(56) References Cited

U.S. PATENT DOCUMENTS

| 6,167,333 | A  | 12/2000 | Gehlot |
| 6,411,615 | B1 | 6/2002  | DeGolia et al. |
| 6,587,684 | B1 | 7/2003  | Hsu et al. |
| 7,068,676 | B1 | 6/2006  | Sugaya et al. |
| 7,269,629 | B2 | 9/2007  | Zmudzinski et al. |
| 7,474,650 | B2 | 1/2009  | O'Neill |

(Continued)

FOREIGN PATENT DOCUMENTS

JP    10312370    11/1998

OTHER PUBLICATIONS

Office Action issued by the State Intellectual Property Office of the People's Republic of China for Application No. 200880016075.1, dated Aug. 25, 2011.

(Continued)

*Primary Examiner* — David Payne
*Assistant Examiner* — Omar S Ismail (57) ABSTRACT

Systems and methods are provided for customer premises equipment (CPE) on a passive optical network (PON). A system includes a packet processor having at least an active mode and a sleep mode, the packet processor configured to processes streams of data packets received in a data plane from an optical line terminal (OLT) through the PON when in an active mode and to enter the sleep mode when not receiving data packets in the data plane. A system further includes a micro-controller, separate from the packet processor, configured to receive from an OLT operation and management (OAM) messages that are transmitted in a control plane, and to process the OAM messages by, selectively transmitting to a central office, without waking up the packet processor, an acknowledgement message, or waking up the packet processor to receive data packets in the data plane.

23 Claims, 7 Drawing Sheets

(56) References Cited

U.S. PATENT DOCUMENTS

| | | |
|---|---|---|
| 7,787,439 B1 | 8/2010 | Oz et al. |
| 7,787,443 B2 | 8/2010 | Varney et al. |
| 7,818,389 B1 * | 10/2010 | Chiang ................... H01M 4/92 709/212 |
| 7,953,407 B1 | 5/2011 | Makipaa |
| 7,957,279 B2 | 6/2011 | Ben-Dvora et al. |
| 7,957,403 B2 | 6/2011 | Jansson |
| 8,006,110 B2 | 8/2011 | Ober |
| 8,493,966 B2 | 7/2013 | Bendelac |
| 8,885,531 B1 * | 11/2014 | Gong ................ H04W 52/0206 370/235 |
| 2002/0009983 A1 | 1/2002 | Pritchett et al. |
| 2003/0135622 A1 | 7/2003 | Anderson et al. |
| 2004/0017824 A1 | 1/2004 | Koenck et al. |
| 2005/0021728 A1 | 1/2005 | Sugimoto |
| 2005/0144495 A1 | 6/2005 | Nakajima et al. |
| 2005/0190709 A1 | 9/2005 | Ferchland et al. |
| 2006/0116127 A1 | 6/2006 | Wilhoite et al. |
| 2007/0004436 A1 | 1/2007 | Stirbu |
| 2007/0060125 A1 | 3/2007 | Rahim |
| 2007/0115258 A1 | 5/2007 | Cupps et al. |
| 2011/0007679 A1 * | 1/2011 | Tsai ........................ H04M 1/73 370/311 |
| 2011/0156866 A1 | 6/2011 | Denison et al. |
| 2012/0051748 A1 * | 3/2012 | Hotta ................... H04B 10/272 398/58 |
| 2012/0188896 A1 * | 7/2012 | Ruiz Lopez ............ H04L 12/12 370/252 |

OTHER PUBLICATIONS

Supplementary European Search Report mailed on Aug. 11, 2010 from related European Application No. EP08835069.

XP-001541426 "CoolSpots: Reducing the Power Consumption of Wireless Mobile Devices with Multiple Radio Interfaces" pp. 220-232.

* cited by examiner

SYSTEMS AND METHODS FOR ADVANCED POWER MANAGEMENT FOR OPTICAL NETWORK TERMINAL SYSTEMS ON CHIP

CROSS-REFERENCE TO RELATED APPLICATIONS

The present application claims priority from U.S. Provisional Application Ser. No. 61/713,876 entitled "Advanced Power Management for ONT SoCs," filed 15 Oct. 2012, the entirety of which is hereby incorporated by reference.

FIELD

This disclosure is related generally to network communications and more particularly to power saving in an optical communication network.

BACKGROUND

Optical Line Terminal (OLT) devices operate as service provider endpoints in passive optical networks (PON). The OLT converts between the electrical signals that are used by equipment of a service provider and the fiber optic signals transmitted over the PON. OLT devices continuously stream frames to multiple Customer Premises Equipment units (CPEs) for processing and forwarding. The CPEs, also referred to as optical network terminals (ONTs) or optical network units (ONUs), typically function as a gateway between a service provider network and a home or small business network.

Downstream frames that are transmitted on a PON typically comprise several predefined fields and include data packets (user traffic) as well as various control structures for managing the connection between the OLT and CPE, and for coordinating the upstream transmission time division multiplexing (TDM) mechanism employed by CPE devices on the other end of that network. In the upstream direction, PON CPE devices are expected to transmit upstream frame when requested by the OLT. The upstream frames may contain data packets (user traffic), idle frames or/and various status messages as well as upstream traffic reports. In an effort to maintain PON synchronization protocol and connectivity between OLT and ONUs/ONTs, even during times of inactivity when there is no user traffic to send in either directions (downstream or upstream), the OLT typically periodically transmits operation and management (OAM) messages to the CPE devices as well as upstream bandwidth allocations for CPE devices. In response to OAM messages, the CPE devices are configured transmit acknowledgment, status, or report messages as mandated by the relevant standard. In general CPE device is expected to complete a transmission during every upstream bandwidth allocation assigned to it by the OLT, when there is no user traffic or OAM messages to send to the OLT, CPE will generate and transmit idle frames and/or messages in response to the corresponding upstream bandwidth allocation as mandated by the relevant PON protocol.

The description above is presented as a general overview of related art in this field and should not be construed as an admission that any of the information it contains constitutes prior art against the present patent application.

SUMMARY

Systems and methods are provided for customer premises equipment (CPE) on a passive optical network (PON). A system includes a packet processor having at least an active mode and a sleep mode, the packet processor configured to processes streams of data packets received in a data plane from an optical line terminal (OLT) through the PON when in an active mode as well as transmit packets in a data plane towards the OLT through the PON, and to enter the sleep mode when not receiving or sending data packets in the data plane. A system further includes a micro-controller, separate from the packet processor, configured to receive from an OLT operation and management (OAM) messages as well as upstream bandwidth allocations that are transmitted in a control plane, and to process the OAM messages as well as upstream bandwidth allocations by, selectively transmitting to a central office, without waking up the packet processor, an acknowledgement, report or status message, or waking up the packet processor to receive data packets in the data plane.

As another example, in a method of communicating with an optical line terminal (OLT) through a passive optical network (PON), data packets are received at a PON customer premises equipment (CPE) device, and the received data packets are processed at a packet processor of the PON CPE device. User traffic is received at home network interface of the CPE, and send towards OLT through PON interface. The packet processor is placed into a sleep mode when no data packets are received for at least a threshold period of time from both interfaces. An operation and management (OAM) message is received from the OLT, and one or more acknowledgment, status, or report messages are transmitted to the OLT according to a relevant protocol in response to the OAM message using a micro-controller module that is a separate module from the packet processor without waking the packet processor from the sleep mode. A data packet or an indication of an incoming data packet is received at the PON CPE device, and the micro-controller is used to wake the packet processor from the sleep mode in response to the receiving of the data packet or indication.

DETAILED DESCRIPTION

Figure 1:
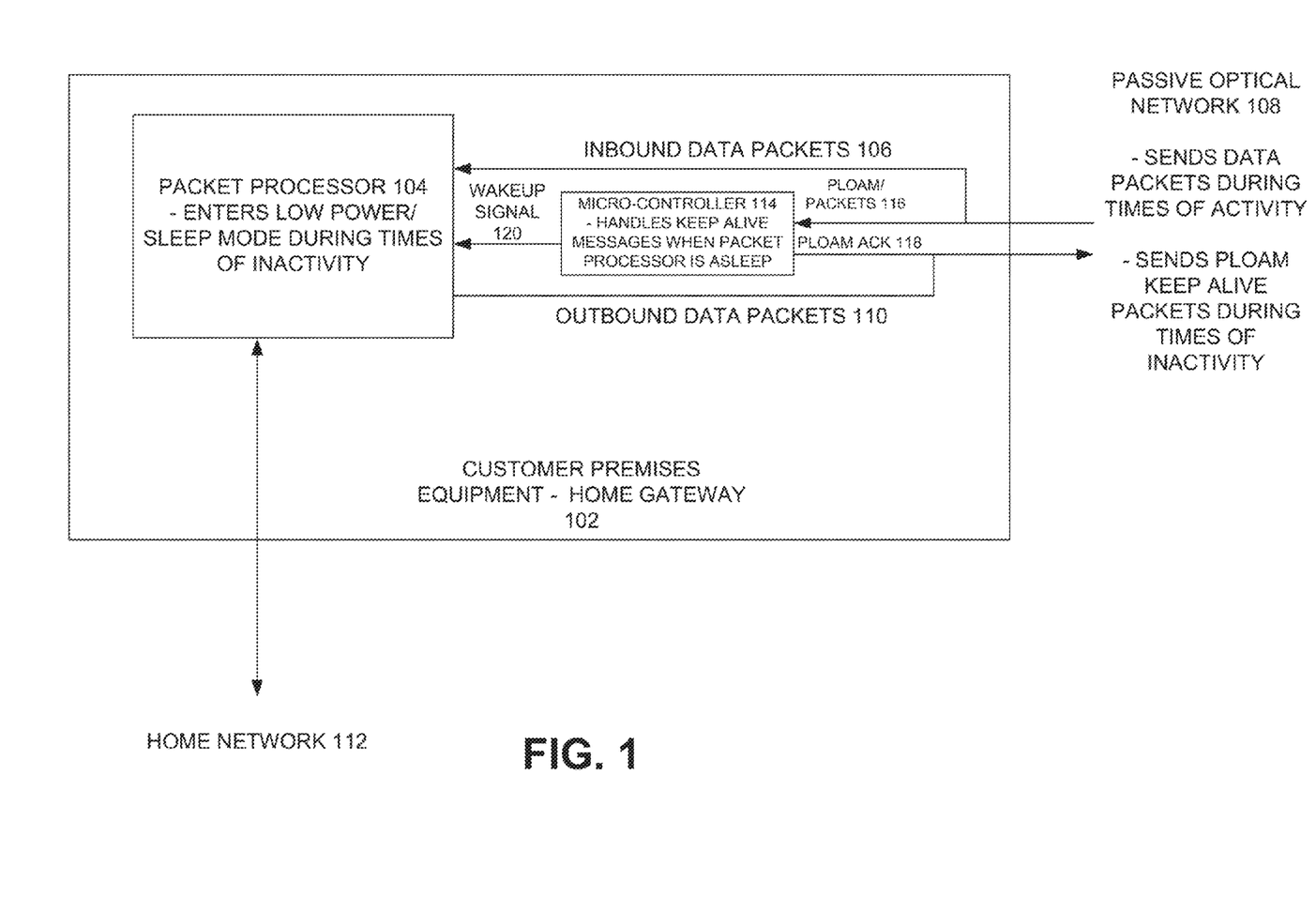
FIG. 1 is a block diagram depicting a CPE coupled to an OLT through a PON in one embodiment of the disclosure.

FIG. 1 is a block diagram depicting a PON Customer Premises Equipment (CPE) unit, such as home gateway 102, coupled to an Optical Line Terminal (OLT) (not shown) through a PON 108 in one embodiment of the disclosure. The PON CPE 102 includes a packet processor 104. The packet processor 104 is configured to have an active mode and a sleep mode. In the active mode, the packet processor 104 is configured to process streams of data packets 106 received in a data plane from an OLT through PON 108. In one embodiment of the disclosure, the packet processor 104 is configured to transmit outbound, that is upstream, packets 110 to the OLT over PON 108 to facilitate bi-directional communication between the OLT and a home network 112, via the CPE 102, over PON 108. The packet processor 104 is configured to enter the sleep mode when not receiving or transmitting data packets 106, 110 in the data plane. In one embodiment of the disclosure, the packet processor 104 exhibits significantly reduced power consumption when in the sleep mode, as compared to when in the active mode.

The CPE 102 further includes a micro-controller 114 that is a separate module or integrated circuit from the packet processor 104, in an embodiment. During inactivity periods the micro-controller 114 is configured to receive OAM messages 116, such as, for example in GPON compliant networks, Physical Layer Operations, Administration, and Maintenance (PLOAM) messages, that are periodically transmitted (e.g., every 10 ms) by a OLT device 108 in a control plane even when there are no data packets that are being received or transmitted. In PON networks that are compliant with other standards, such as EPON, other suitable OAM messages, such as multi-point control protocol (MPCP) messages, are received. The OAM messages 116 are sent by OLT to maintain synchronization and connectivity between the PON CPE 102 and the OLT 108. In an embodiment, without waking up the packet processor 104, the micro-controller 114 is configured to process the OAM messages by selectively transmitting to the OLT 108, located at the central office, one or more acknowledgment, status or report message 118, in response to each received OAM downstream message according to the relevant protocol 116. The micro-controller 114 is further configured to wake up the packet processor 104 via a wake up signal 120 when the PON CPE 102 receives an incoming data packet 106 or an indication of an incoming data packet 106, in an embodiment.

In one embodiment of the disclosure, the micro-controller 114 is configured to operate at a significantly lower power level than the packet processor 104. During periods of inactivity, the micro-controller 114 is configured to handle the synchronization operations while packet processor 104 is maintained in a low power mode. By periodically receiving OAM messages and selectively transmitting response messages according to the relevant protocol, an active connection to the passive optical network 108 is maintained, in an embodiment. The micro-controller 114 thus handles such synchronization without assistance from the higher power consuming packet processor 104. By enabling the packet processor 104 to enter a sleep state, overall power consumption of the PON CPE 102 is reduced. Moreover, by using the micro-controller 114 to maintain an active connection with the OLT 108, response to a resumption of data packet 106 traffic by providing a wakeup signal 120 improves the response speed of CPE 201 in comparison to conventional systems that allow the active connection to lapse during periods of data packet 106 inactivity.

In one embodiment of the disclosure, the CPE 102 is configured to comply with a 1-Watt Standby regulation, such as U.S. Executive Order 13221, which mandates that federal agencies choose devices with low-standby energy consumption (e.g., no more than 1-Watt) when purchasing certain network products. In another embodiment of the disclosure, the PON CPE 102 is configured to comply with a 0.5-Watt Standby regulation such as European Parliament Commission Regulation 1275/2008. Other regions, countries, companies, and consumers are similarly pursuing such energy efficient technological requirements.

Figure 2:
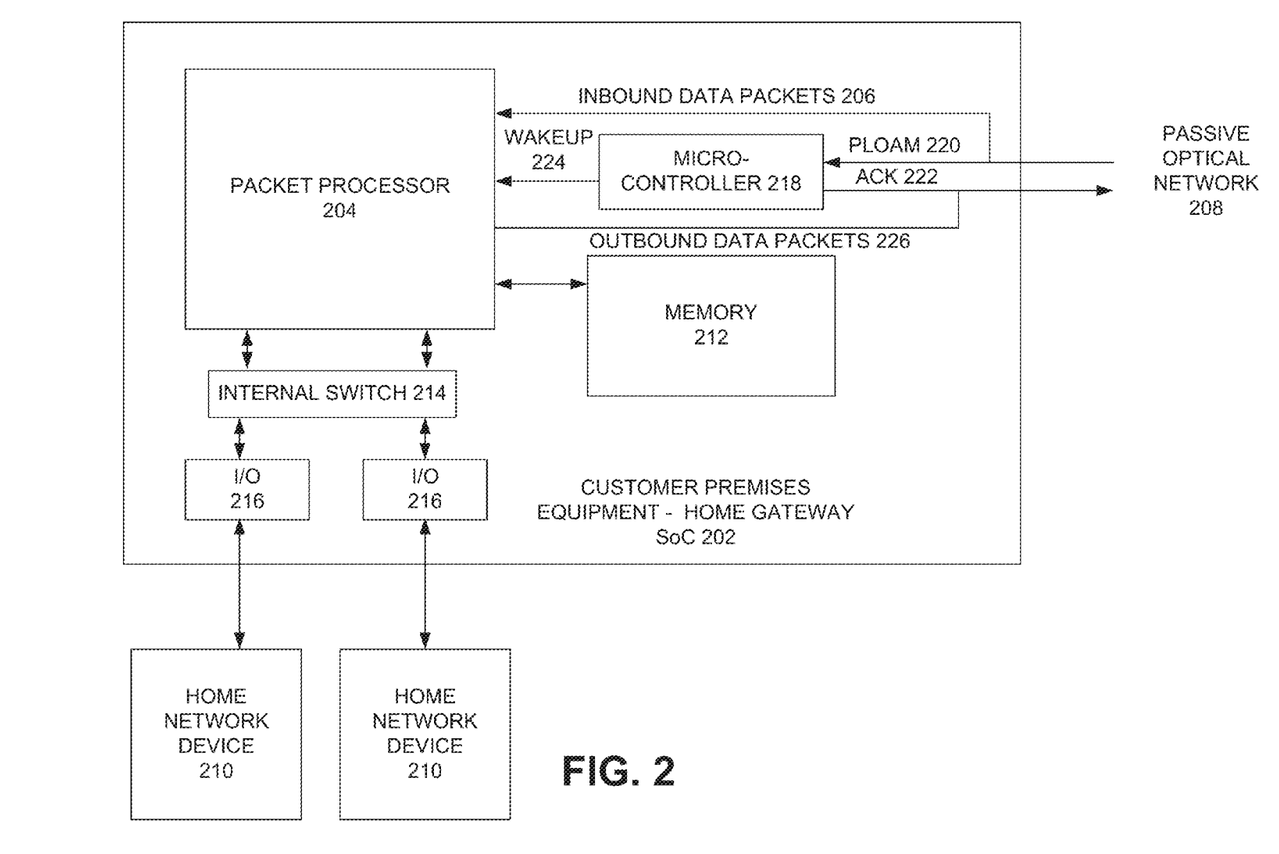
FIG. 2 is a block diagram depicting a PON CPE that is configured to manage power modes of a packet processor and one or more peripheral devices.

In addition to placing a packet processor into a low power or sleep mode for power savings, in one embodiment of the disclosure, CPE 102 is configured to reduce power consumption of other peripheral devices that are configured to facilitate communication of data from the service provider network to home network devices, such as interactive user devices that in one embodiment of the disclosure include desktop computers, laptop computers, tablet devices, smart phones, or televisions. FIG. 2 is a block diagram depicting a CPE 202, such as for example a home gateway system on chip, that is configured to manage power modes of a packet processor and one or more peripheral devices. The CPE 202 is implemented as a system on chip that includes a packet processor 204 having an active mode and a sleep mode that is configured to process streams of data packets 206 from/to an OLT over a passive optical network 208 in an active mode and to enter a sleep mode when not receiving or transmitting data packets. The CPE 202 further includes a plurality of peripheral devices that are configured to facilitate communication of data from the OLT to one or more home network devices 210. In one embodiment of the disclosure, the CPE system on chip 202 includes a memory, such as a dynamic random access memory (DRAM) 212 with which the packet processor 204 interacts in processing streams of data packets 206, an internal switch 214 that routes data between the packet processor 204 and the one or more home network devices 210, and one or more input/output devices 216 that are configured to function as interfaces between the PON CPE 202 and the one or more home network devices 210.

The CPE system on chip 202 also includes a micro-controller 218 that is separate from the packet processor 204 that is configured to receive OAM messages 220 (e.g., GPON PLOAM messages or other suitable OAM messages compliant with a different PON protocol or standard) from the OLT 208 during periods of data packet 206 transmission inactivity. During such periods of inactivity, the micro-controller 218 transmits, in an embodiment, one or more acknowledgment, status or report messages 222 back to the OLT according to the relevant protocol 208 to maintain synchronization and connectivity between the PON CPE 202 and the OLT 208 without aid from the packet processor 204. By doing so, the packet processor 204 is able to enter a low power or sleep state during periods of data packet 206 transmission inactivity.

In one embodiment of the disclosure, during periods of data packet transmission 206 inactivity, the PON CPE 202 places one or more of the peripheral devices 212, 214, 216 into a low power or sleep mode in addition to the packet processor 204. For example, when the packet processor 204 or micro-controller 218 senses that no data packets 206 have been received from the OLT 208 for a predetermined threshold period of time, the peripheral devices 212, 214, 216 are commanded to enter a sleep state (e.g., the memory 212 is instructed to enter a self-refresh mode, and the switch 214 and I/O devices 216 are commanded to enter a sleep state). When in sleep mode, the micro-controller 218 is configured to handle maintaining synchronization with the OLT, thereby enabling fast resumption (e.g., within 10 ms) of communications via a wakeup signal 224 when data packets 206 or an indication of incoming data packets are received or when a home network device 210 requests that outbound data packets 226 be transmitted.

Figure 3:
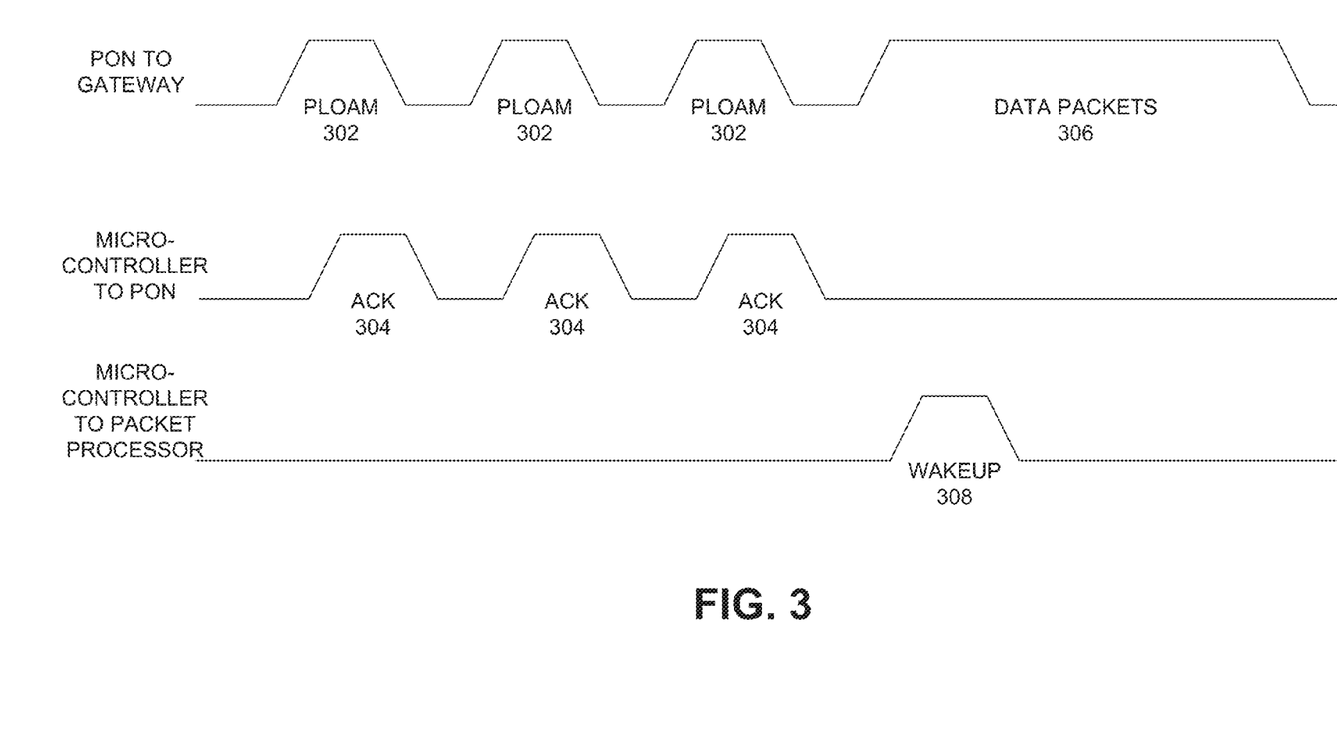
FIG. 3 is a timing diagram depicting example communications of a micro-controller in one embodiment of the disclosure.

FIG. 3 is a timing diagram depicting example communications of a micro-controller in one embodiment of the disclosure. Although the timing diagram is described in the context of PLOAM messages that are compliant with a GPON standard, it is noted that diagrams are similar for other suitable PON standards. During a period of data packet transmission inactivity, a network, for example an OLT, transmits OAM messages to a CPE to maintain timing synchronization. Such OAM messages are represented in FIG. 3 by the periodic (e.g., every 10 ms) PLOAM messages 302 received at the CPE optical network terminal from the PON. In response to each of the OAM messages 302, the micro-controller is configured reply with one or more acknowledgment, status or report message 304 according to the relevant protocol. When the home network receives an incoming data packet 306 or an indication that data packets are soon to be incoming, the micro-controller transmits a wakeup signal 308 to the packet processor, commanding the packet processor to exit the sleep mode and process the to-be-received incoming data packets 306.

Figure 4:
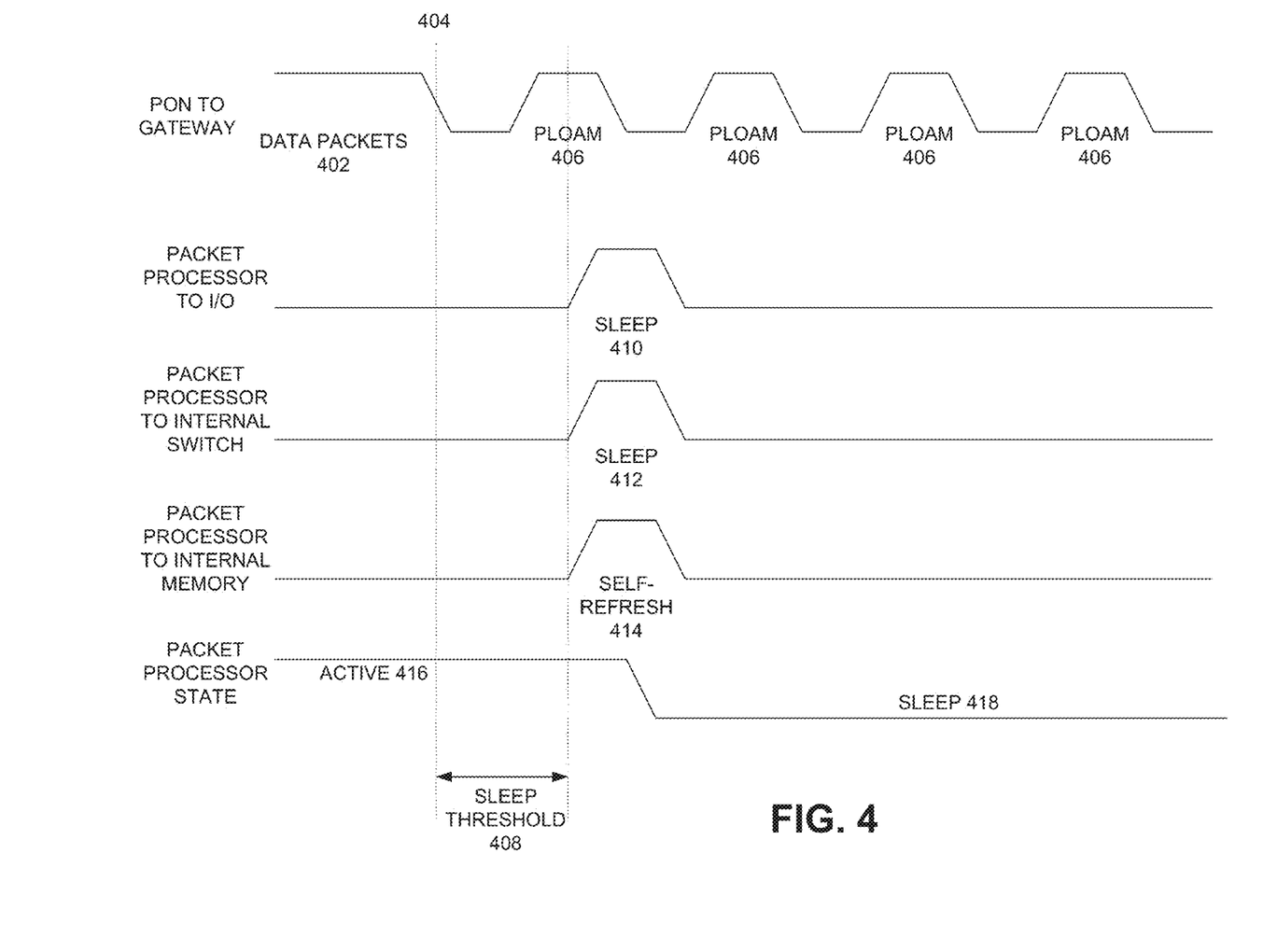
FIG. 4 is a timing diagram depicting components of a PON CPE entering sleep and low power modes during a period of data packet transmission inactivity.

FIG. 4 is a timing diagram depicting components of a PON CPE entering sleep and low power modes during a period of data packet transmission inactivity. During a first time period, data packets 402 are received at the PON CPE from the OLT. At 404, the data packet transmission stops, and shortly afterwards, an OLT sends only OAM messages 406 to the PON CPE. Once a threshold period of time 408 elapses since a last data packet transmission ended at 404, the PON CPE determines that it is time for certain components to enter a sleep mode. In one embodiment of the disclosure, the packet processor manages the entry into sleep mode. For example, upon expiry of the sleep threshold 408, the packet processor sends sleep commands 410, 412 to the I/O device and the internal switch, respectively. The packet processor further sends a command 414 to the internal memory to enter a self-refresh mode. Once the packet processor has issued the commands to place the peripheral devices into sleep/low power modes, the packet processor transitions from an active mode 416 to a sleep mode 418. In other embodiments of the disclosure, the micro-controller sends commands to power down certain peripheral devices.

Figure 5:
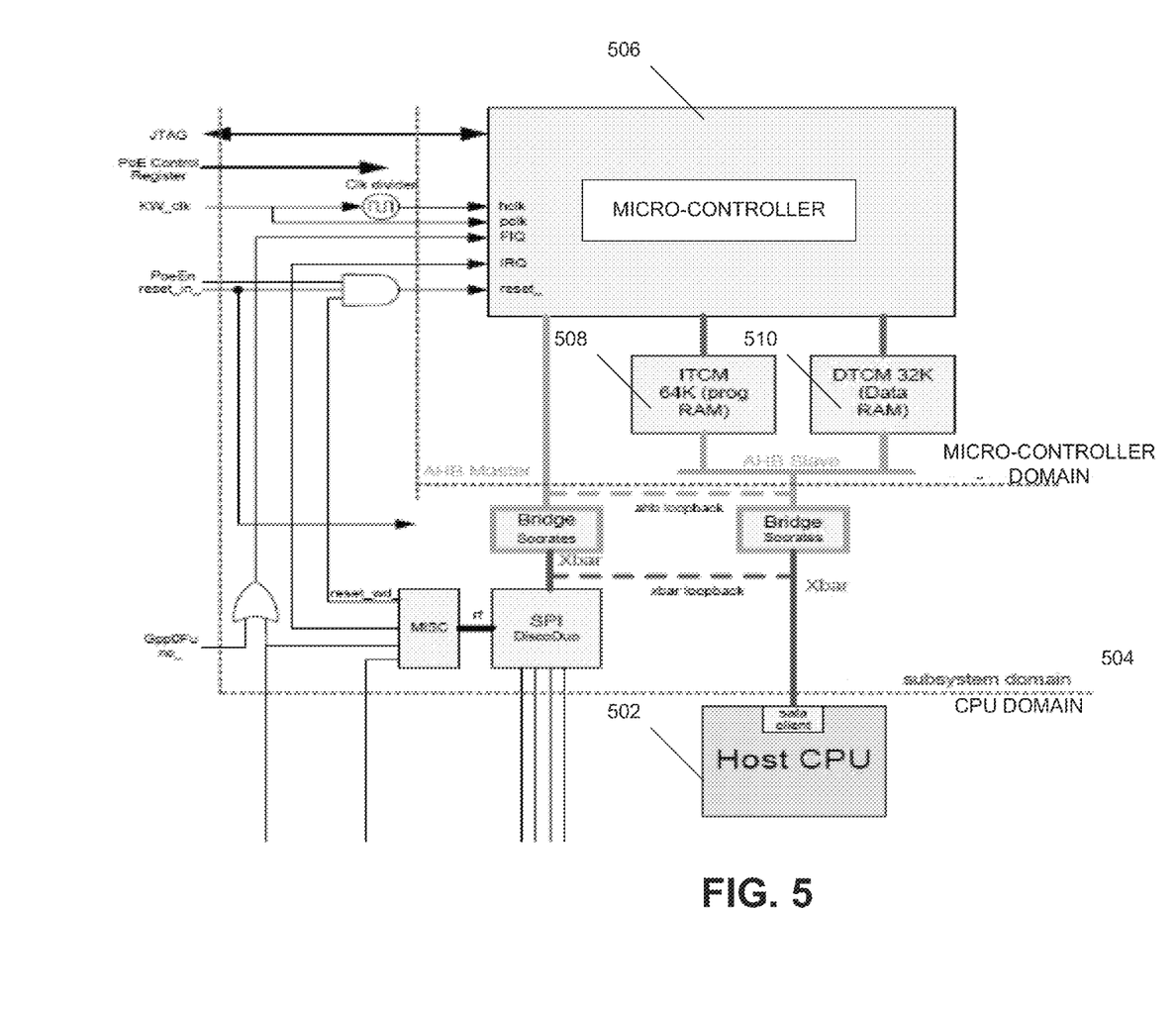
FIG. 5 is a schematic diagram depicting certain components of a PON CPE in one embodiment of the disclosure.

FIG. 5 is a schematic diagram depicting certain components of a PON CPE in one embodiment of the disclosure. The PON CPE includes a packet processor CPU 502 that is configured to process streams of data packets received from a network. The PON CPE further includes a number of subsystem peripheral devices 504 that are configured to facilitate communication of data from the network to user devices of an internal network associated with the PON CPE. A micro-controller 506 that is separate from the host packet processor CPU 502 is configured to handle OAM messages from the network (e.g., an optical line terminal) without aid from the host packet processor CPU 502 or any other general access memories, such as a DRAM. The micro-controller 506, in one embodiment of the disclosure, is instead responsive to one or more tightly coupled memories 508, 510 that contain instructions and data for handling the OAM messages from the network. In one embodiment of the disclosure, an instruction-tightly coupled memory 508 contains an instruction set for utilization by the micro-controller 506 in handling OAM messages and waking the packet processor CPU 502. A data-tightly controlled memory 510 contains data for use by the micro-controller 506 in performing those functions. In one embodiment of the disclosure, during an initialization process, the packet processor CPU 502 populates the instruction-tightly coupled memory 508 with application instruction data, enabling use of updated software/firmware by the micro-controller 506. In one embodiment of the disclosure, the tightly coupled memories 508, 510 are fast on-chip memories that bypass cache associated with the micro-controller 506 and provide a guaranteed level of low latency. Thus, such tightly coupled memories 508, 510 provide low latency memory access that is dedicated to the micro-controller 506 that avoids unpredictability present in some cache memories.

In one embodiment of the disclosure, the CPE of FIG. 5 is fabricated as a system on chip. That system on chip includes a substrate, where the packet processor CPU 502 is disposed on the substrate. The micro-controller 506 is also connected to the substrate as a separate module and is electrically connected to the packet processor CPU 502 via the substrate. The system on chip further includes one or more additional peripheral devices fabricated on the substrate that are configured to facilitate communication of data from the network to a user device. In one embodiment of the disclosure, those peripheral devices include a memory, an input/output device, and an internal switch.

Figure 6:
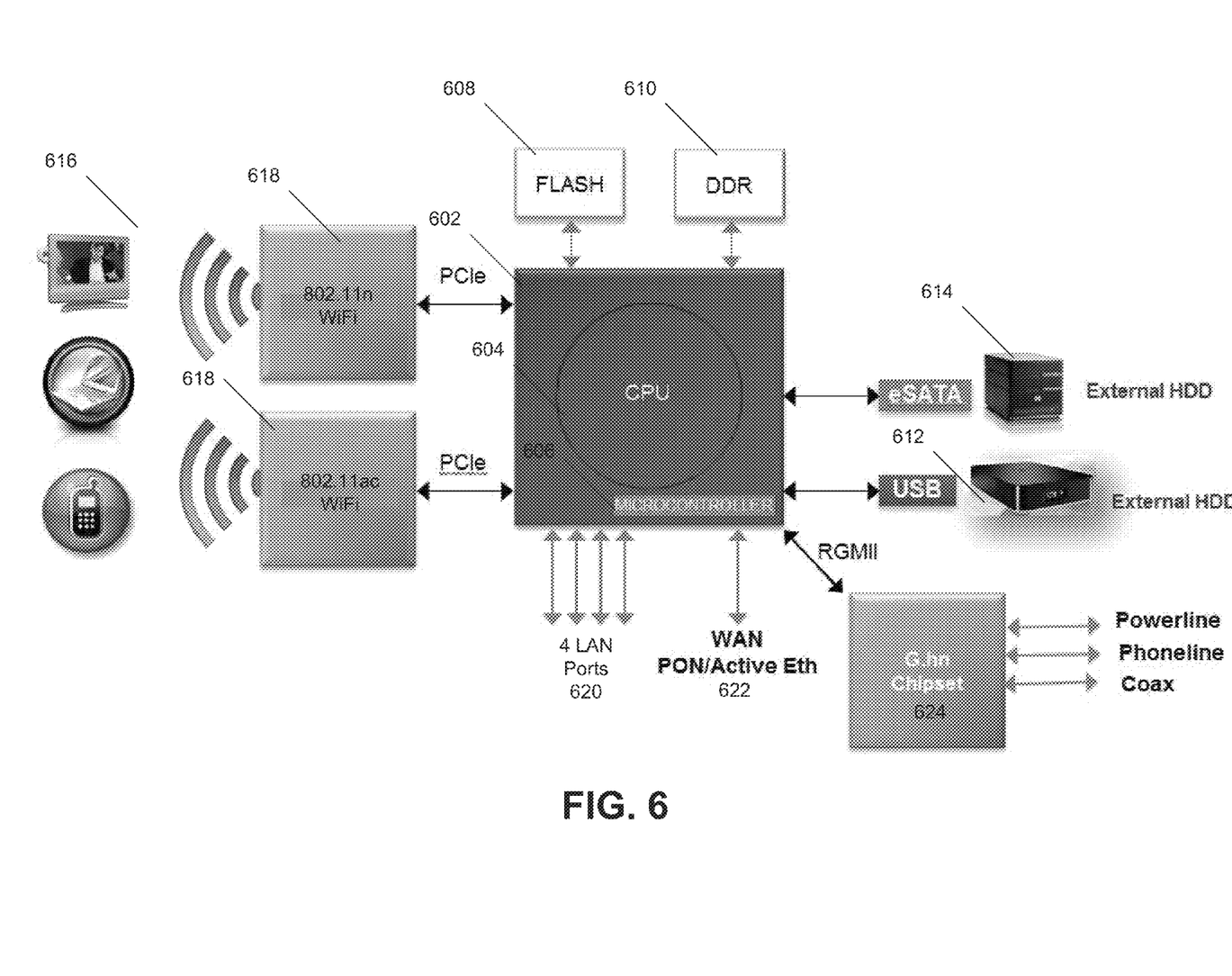
FIG. 6 is a block diagram depicting an example home network that includes a PON CPE device.

FIG. 6 is a block diagram depicting an example home network that includes a CPE device 602. The CPE device 602 includes a packet processor CPU 604 and a micro-controller 606 for handling synchronization with an external network during periods of data packet transmission inactivity. The PON CPE device 602 interacts with certain memories, such as flash memory 608 and DDR memory 610. The CPE device 602 further includes I/O interfaces for interacting with one or more of a USB hard disk 612, an eSATA hard disk 614 and certain user interactive devices 616 (e.g., a television, a computer, a laptop, a smart phone) via one or more WiFi networks 618 such as an 802.11n network. The PON CPE device 602 further includes interfaces for interacting with other networks such as a local area network 620, a wide area network 622, and a media network via a reduced gigabit media independent interface 624.

In one embodiment of the disclosure, the micro-controller 606 of the PON CPE device 602 is configured to place the packet processor CPU 604 and certain peripheral devices into a sleep or standby mode during periods of packet processing inactivity. While the packet processor CPU 604 is in a sleep state, the micro-controller 606 handles OAM messages without waking the packet processing CPU 604. In addition to placing the packet processor CPU 604 into a sleep state, the micro-controller 606, in one embodiment of the disclosure places I/O interfaces for interacting with external components of the home network into low power states, such as a USB interface for interacting with the USB external hard disk 612, an eSATA interface for interacting with the eSATA external hard disk 614, and an I/O interface for interacting with the WiFi networks 618 and the connected user devices 616.

In one embodiment of the disclosure, the micro-controller 606 is configured to act as a proxy for not only the packet processing CPU 604 but also for other peripherals of the system that may receive OAM messages. When the plurality of peripheral devices are in a low power mode and when an OAM message is received that requests an acknowledgment associated with a particular peripheral device, the micro-controller 606 is configured to function as a proxy for the particular peripheral device by transmitting an acknowledgment for the particular peripheral device without waking the particular peripheral device from the low power mode. For example, when an OAM message is received that is directed to a memory (e.g., flash memory 608 or DDR memory 610) that is in a low power or self refresh mode, the micro-controller sends an acknowledgment signal without waking the memory 608, 610 from its low power mode, where the acknowledgment is formatted to appear to be coming from the peripheral of interest.

Figure 7:
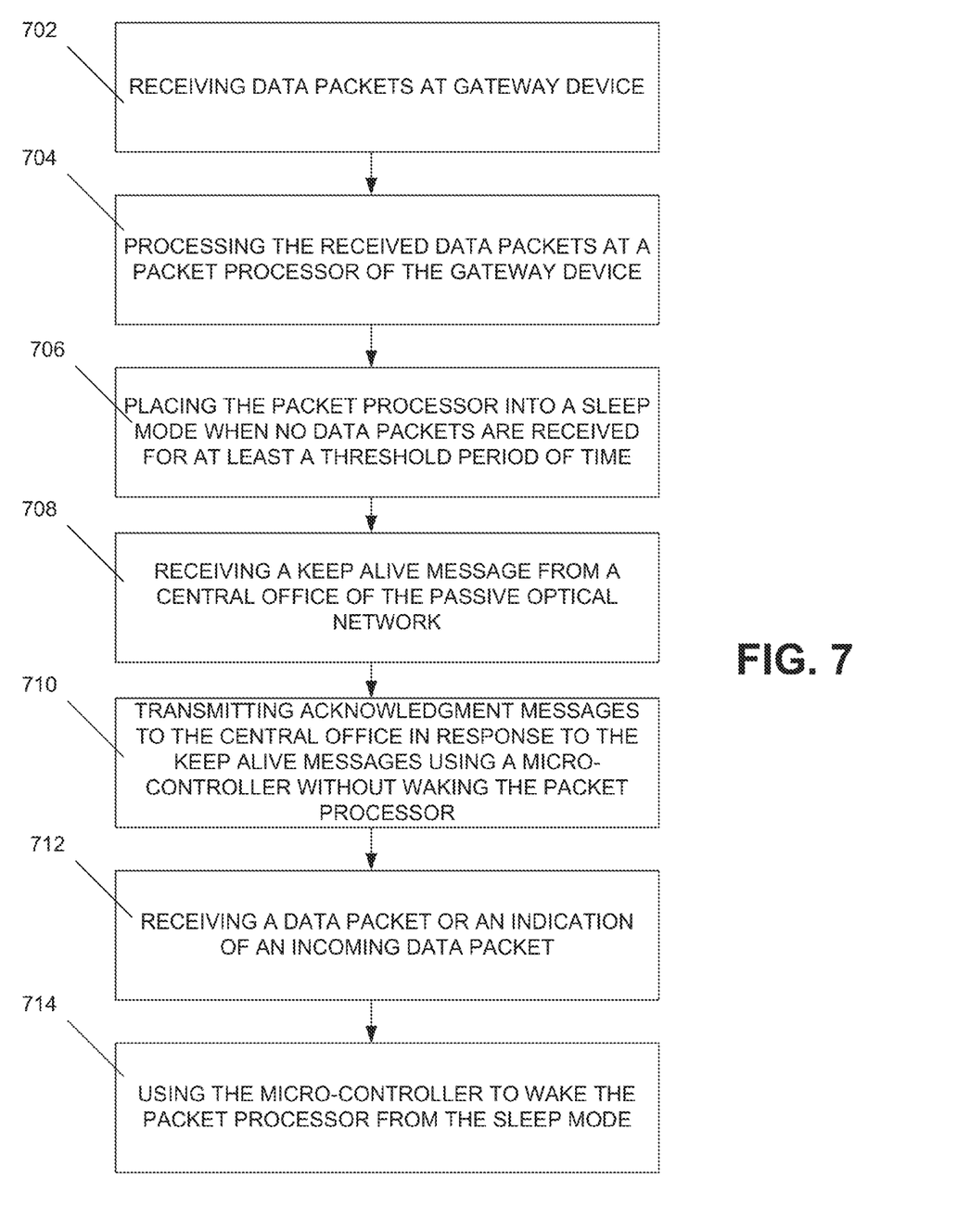
FIG. 7 is a flow diagram depicting a method of communicating with an OLT through PON in one embodiment of the disclosure.

FIG. 7 is a flow diagram depicting a method of communicating with an OLT in one embodiment of the disclosure. At 702, data packets are received at a PON CPE device. At 704, the received data packets are processed at a packet processor of the gateway device. The packet processor is placed into a sleep mode at 706 when no data packets are received for at least a threshold period of time. At 708, an OAM message is received at the PON CPE device from the OLT, and at 710 one or more acknowledgment, status or report messages are transmitted to the OLT according to the relevant protocol in response to the OAM message using a micro-controller module that is a separate module from the packet processor without waking the packet processor from the sleep mode. At 712, a data packet or an indication of an incoming data packet at the PON CPE device, and at 714 the micro-controller is used to wake the packet processor from the sleep mode in response to the receiving of the data packet or indication.

This application uses examples to illustrate the invention. The patentable scope of the invention includes other examples. For example, in an embodiment of the disclosure a PON CPE is configured to interface with a Plain Old telephone Service (POTS). In such an embodiment, the PON CPE functions as a interface with the POTS network—i.e. a telephone device is connected to the PON CPE, where the PON CPE functions as public switched telephone network (PSTN) gateway or VoIP (Voice over IP) gateway. That PSTN gateway converts telephony traffic into IP for transmission over a data network. In such an embodiment, a micro-controller is expected place a packet processor during periods of no transmissions and to wake up packet processor at an "off-hook" indication from the telephone device.

It is claimed:

1. Customer premises equipment (CPE) on a passive optical network (PON), the CPE comprising:
   a packet processor having at least an active mode and a sleep mode, the packet processor configured to processes streams of data packets received in a data plane from an optical line terminal (OLT) through the PON when in the active mode as well as transmit packets in a data plane towards the OLT through the PON, and to enter the sleep mode when not receiving data packets in the data plane;
   a plurality of peripheral devices configured to facilitate communication of data from the OLT to a user device; and
   a micro-controller, separate from the packet processor, the micro-controller configured to function as a proxy for a particular peripheral device, so as to receive from an OLT, when the plurality of peripheral devices are in a low power mode, operation and management (OAM) messages that are transmitted in a control plane, an OAM message requesting an acknowledgment associated with the particular peripheral device, and to process the OAM messages by,
      selectively transmitting to a central office, without waking up the packet processor from the sleep mode and without waking up the particular peripheral device from the low power mode, an acknowledgement message for the particular peripheral device, or
      waking up the packet processor to receive data packets in the data plane.

2. The CPE of claim 1, wherein the micro-controller is configured to periodically receive the OAM messages from the central office during periods when no data packets are being received from the central office.

3. The CPE of claim 2, wherein the OAM messages received from the central office are GPON physical layer operations and maintenance (PLOAM) messages.

4. The CPE of claim 2, wherein the OAM messages received from the central office are EPON multi-point control protocol (MPCP) messages.

5. The CPE of claim 2, wherein the micro-controller is configured to utilize the OAM messages and one or more acknowledgment, status, or report messages to maintain synchronization and connectivity between the CPE and the OLT according to a relevant protocol.

6. The CPE of claim 1, wherein the packet processor is configured to command the plurality of peripheral devices to enter the low power mode.

7. The CPE of claim 1, wherein the micro-controller is configured to command the plurality of peripheral devices to enter the low power mode.

8. The CPE of claim 1, wherein the micro-controller is responsive to one or more tightly coupled memories that contain instructions and data for handling OAM messages from the OLT.

9. Customer premises equipment (CPE) on a passive optical network (PON), the CPE comprising:
   a packet processor having at least an active mode and a sleep mode, the packet processor configured to processes streams of data packets received in a data plane from an optical line terminal (OLT) through the PON when in the active mode as well as transmit packets in a data plane towards the OLT through the PON, and to enter the sleep mode when not receiving data packets in the data plane;
   an instruction set tightly coupled memory configured to receive application instruction data from the packet processor during an initialization process;
   a data tightly coupled memory; and
   a micro-controller, separate from the packet processor and responsive to the instruction set tightly coupled memory and to the data tightly coupled memory, the micro-controller being configured to receive from an OLT operation and management (OAM) messages that are transmitted in a control plane, and to process the OAM messages by,
      selectively transmitting to a central office, without waking up the packet processor, an acknowledgement message, wherein the micro-controller transmits the acknowledgement message using the application instruction data, or
      waking up the packet processor to receive data packets in the data plane, wherein the microcontroller wakes up the packet processor using the application instruction data.

10. A method of communicating with an optical line terminal (OLT) through a passive optical network (PON), the method comprising:
    receiving data packets at a customer premises equipment (CPE) device;
    processing the received data packets at a packet processor of the CPE device;
    placing the packet processor into a sleep mode when no data packets are received for at least a threshold period of time;
    placing a plurality of peripheral devices configured to facilitate communication of data from the service provider through the PON to a user device into a low power mode;
    receiving, at the CPE device, operation and management (OAM) messages or an upstream bandwidth allocation from the OLT, the OAM messages including a particular OAM message that seeks an acknowledgment from a particular one of the peripheral devices;

transmitting one or more acknowledgment, status, or report messages to the OLT according to a relevant protocol in response to the OAM messages using a micro-controller module that is a separate module from the packet processor without waking the packet processor from the sleep mode;

transmitting an acknowledgment to the particular OAM message using the micro-controller without waking the particular peripheral device from the low power mode, the micro-controller being configured to act as a proxy for the particular peripheral device in transmitting the acknowledgment to the particular OAM message;

receiving a data packet or an indication of an incoming data packet at the CPE device; and using the micro-controller to wake the packet processor from the sleep mode in response to the receiving of the data packet or indication.

11. The method of claim 10, further comprising:
periodically receiving additional OAM messages and transmitting additional one or more acknowledgments, status, or report messages as required by the relevant protocol during a period when no data packets are being received.

12. The method of claim 10, wherein the transmitting acknowledgement messages comprises processing at the micro-controller GPON OAM messages in the form of physical layer operations and maintenance (PLOAM) messages.

13. The method of claim 10, wherein the transmitting acknowledgement messages comprises processing at the micro-controller EPON OAM messages in the form of multipoint control protocol (MPCP) messages.

14. The method of claim 10, further comprising:
maintaining synchronization and connectivity between the CPE and the OLT using the OAM messages and the acknowledgment, status, or report messages according to the relevant protocol.

15. The method of claim 10, further comprising:
using the packet processor to command the plurality of peripheral devices to enter the low power mode before the packet processor enters the sleep mode.

16. The method of claim 10, further comprising:
using the micro-controller to command the plurality of peripheral devices to enter the low power mode before the packet processor enters the sleep mode.

17. The method of claim 10, further comprising:
using the micro-controller without waking the packet processor from the sleep mode in order to generate and transmit idle frames and/or messages in response to the corresponding upstream bandwidth allocation as mandated by the relevant PON protocol, when there is no user traffic to send to the OLT.

18. The method of claim 10, further comprising:
transmitting idle frames and/or messages to the OLT according to the relevant PON protocol in response to the corresponding upstream bandwidth allocation received from the OLT.

19. A method of communicating with an optical line terminal (OLT) through a passive optical network (PON), the method comprising:
receiving data packets at a customer premises equipment (CPE) device;

processing the received data packets at a packet processor of the CPE device;

placing the packet processor into a sleep mode when no data packets are received for at least a threshold period of time;

receiving, at the CPE device, an operation and management (OAM) message or upstream bandwidth allocation from the OLT;

using a micro-controller to access application instruction data from a memory, the micro-controller being a separate module from the packet processor;

transmitting, using the application instruction data, one or more acknowledgment, status, or report messages to the OLT according to a relevant protocol in response to the OAM message using the micro-controller without waking the packet processor from the sleep mode;

receiving a data packet or an indication of an incoming data packet at the CPE device; and using the micro-controller to wake the packet processor from the sleep mode in response to the receiving of the data packet or indication.

20. The method of claim 19, further comprising:
initializing the micro-controller, wherein initializing the micro-controller includes populating the memory with instruction data from the packet processor.

21. The CPE of claim 9, wherein the micro-controller is configured to periodically receive OAM messages from the central office during periods when no data packets are being received from the central office.

22. The method of claim 19, further comprising:
periodically receiving additional OAM messages and transmitting additional one or more acknowledgments, status, or report messages as required by the relevant protocol during a period when no data packets are being received.

23. The method of claim 19, further comprising:
using the micro-controller without waking the packet processor from the sleep mode in order to generate and transmit idle frames and/or messages in response to the corresponding upstream bandwidth allocation as mandated by the relevant PON protocol, when there is no user traffic to send to the OLT.

* * * * *